United States Patent
Kinugasa

(10) Patent No.: US 10,370,783 B2
(45) Date of Patent: Aug. 6, 2019

(54) BINDING CORD FOR MOTOR

(71) Applicant: GOSEN CO., LTD., Osaka-shi, Osaka (JP)

(72) Inventor: Atsushi Kinugasa, Hyogo (JP)

(73) Assignee: GOSEN CO., LTD., Osaka (JP)

( * ) Notice: Subject to any disclaimer, the term of this patent is extended or adjusted under 35 U.S.C. 154(b) by 147 days.

(21) Appl. No.: 15/146,543

(22) Filed: May 4, 2016

(65) Prior Publication Data

US 2016/0326675 A1 Nov. 10, 2016

(30) Foreign Application Priority Data

May 7, 2015 (JP) ................................. 2015-095085

(51) Int. Cl.
*D04C 1/02* (2006.01)
*D04C 1/12* (2006.01)

(52) U.S. Cl.
CPC ............... *D04C 1/02* (2013.01); *D04C 1/12* (2013.01); *B60L 2220/50* (2013.01); *Y02T 10/641* (2013.01)

(58) Field of Classification Search
CPC ..................................... D04C 1/02; D04C 1/12
See application file for complete search history.

(56) References Cited

U.S. PATENT DOCUMENTS

| | | | | |
|---|---|---|---|---|
| 4,167,847 A | * | 9/1979 | Arai ......................... | D02G 1/20 57/208 |
| 6,997,096 B2 | * | 2/2006 | Niwa ....................... | D04C 1/12 87/9 |
| 7,074,470 B2 | * | 7/2006 | Niwa ....................... | D04C 1/06 428/36.3 |
| 8,910,554 B2 | * | 12/2014 | Kinugasa ................. | D04C 1/06 87/9 |
| 2004/0094023 A1 | | 5/2004 | Niwa | |

FOREIGN PATENT DOCUMENTS

| | | |
|---|---|---|
| JP | 8-013300 | 1/1996 |
| JP | 10-273825 | 10/1998 |
| JP | 11-217777 | 8/1999 |
| JP | 2001-248075 | 9/2001 |
| JP | 2004-176242 | 6/2004 |
| JP | 2009-174104 | 8/2009 |

OTHER PUBLICATIONS

Office Action issued in corresponding Japanese Patent Application No. 2015-095085, dated May 29, 2018, 6 pages with a machine translation.

* cited by examiner

*Primary Examiner* — Shaun R Hurley
(74) *Attorney, Agent, or Firm* — Hamre, Schumann, Mueller & Larson, P.C.

(57) ABSTRACT

A binding cord for a motor (i) reduces damage to a motor component that is bound with the binding cord, (ii) has high fastening properties when the binding cord is tied, (iii) does not loosen after the binding cord is tied, (iv) prevents fluff from falling off, and (v) is suitable for both mechanical binding and manual binding. A binding cord for a motor of the present invention includes a multifilament yarn made of synthetic fibers. The multifilament yarn is a bulked yarn that has a loop and a slack in the direction of the yarn axis. The multifilament yarn is preferably a non-torque type and processed by a fluid jet. The degree of bulkiness of the multifilament yarn is preferably 1.5 ml/g or more.

28 Claims, 9 Drawing Sheets

BINDING CORD FOR MOTOR

BACKGROUND OF THE INVENTION

1. Field of the Invention

The present invention relates to a binding cord for a motor. In particular, the present invention relates to a binding cord for a motor that is suitable for binding of motor wires of an electric vehicle.

2. Description of Related Art

It has conventionally been required to reduce the harmful substances in the exhaust gas of vehicles while at the same time increasing the fuel efficiency of the vehicles. In recent years, there has been a growing demand to reduce the burden on the global environment. Under these circumstances, the research and development of electric vehicles are carried out actively. For example, the following electric vehicles are being developed at present: a pure electric vehicle (PEV) equipped with a high-capacity secondary battery; a hybrid electric vehicle (HEV) equipped with, e.g., a combination of a gasoline engine and a high-power secondary battery; a fuel cell vehicle (FCV) equipped with a fuel cell; and a fuel cell hybrid electric vehicle (FCHEV) equipped with, e.g., a combination of a fuel cell and a high-power secondary battery. In each case, high-efficiency motors need to be developed. Such motors are used for driving, electric power generation, charging, etc. The motors are strongly required to ensure not only high efficiency, but also stable performance in terms of driving stability. In particular, the motors for electric vehicles should have excellent high temperature oil resistance as compared to general motors for vehicles. It is necessary to place the motors for electric vehicles in an automatic transmission fluid (ATF) to improve the efficiency. Since the ATF may reach a high temperature, the motors should have high heat resistance in the ATF. Moreover, there has also been a demand to develop materials with uniform properties for components of the motors.

When a stator of a motor uses wire-wound coils such as wave winding coils and lap winding coils, the ends of the coils need to be bound with a binding string (binding cord) to prevent the wires from spreading apart, to make the coils compact, and to ensure the insulation distance. The binding cord for a coil is required to have, e.g., oil resistance, heat resistance, strength, and cost effectiveness. The fiber materials include aramid fibers, PPS fibers, and glass fibers. With mass production, the binding cord is generally tied around the coils by machine at present. In the mechanical binding, a space into which a machine is inserted should be provided between the end face of the stator and the ends of the coils. In the manual binding, such a space is not necessary, so that the height of the ends of the coils can be made as low as possible. This can suppress the volume of the coil end portion, and thus can reduce the weight of the motor and the winding resistance. Therefore, the manual binding has the advantage of improving the performance of the motor.

The applicant proposed in Patent Document 1 that filament yarns or spun yarns of synthetic fibers are braided to form a binding cord for a motor. Patent Documents 2 to 3 disclose that filament yarns of synthetic fibers are air interlaced with each other to form a braid. The applicant proposed in Patent Document 4 that a flat tubular binding cord is composed of 8 or more strands of multifilament yarns having high temperature oil resistance. This binding cord has high heat resistance, excellent high temperature oil resistance, flexibility, and good usability. Therefore, the binding cord is highly useful in the mechanical binding. The applicant proposed in Patent Document 5 that spun yarns of synthetic fibers are braided to form a binding cord for a motor.

PRIOR ART DOCUMENTS

Patent Documents

Patent Document 1: JP 1996(H8)-13300
Patent Document 2: JP 1998(H10)-273825
Patent Document 3: JP 2001-248075
Patent Document 4: JP 2004-176242
Patent Document 5: JP 2009-174104

SUMMARY OF THE INVENTION

The normal filament yarns of synthetic fibers disclosed in Patent Documents 1 to 4 are non-bulked yarns. When the binding cord including these filament yarns is used in the manual binding, the yarns easily slide over each other while the binding cord is being tied, and the yarns are likely to loosen even after the binding cord has been tied. This leads to the following problems: (1) The height of the ends of the coils cannot be made lower because the binding portion expands; (2) The windings do not adhere to each other and move freely; and (3) A considerable burden is placed on workers, and the workers tend to hurt their hands. The binding cord including the spun yarns in Patent Document 5 has good binding properties and does not recover after it is tied. However, compared to the filament yarns, the strength is low, fluff is generated during processing, and further the fluff falls off and makes the oil dirty during the operation of the motor.

To solve the above conventional problems, the present invention provides a binding cord for a motor that (i) reduces damage to a motor component that is bound with the binding cord, (ii) has high fastening properties when the binding cord is tied, (iii) does not loosen after the binding cord is tied, (iv) prevents fluff from falling off, and (v) is suitable for both mechanical binding and manual binding.

A binding code for a motor of the present invention includes a multifilament yarn made of synthetic fibers. The multifilament yarn is a bulked yarn that has a loop and a slack in a direction of a yarn axis.

In the present invention, the knot of the binding cord does not loosen, and a reduction in the binding force at the ends of the coils is prevented. Thus, the present invention has the following effects.

(1) The friction between the yarns is larger in the bulked multifilament yarn than in the non-bulked multifilament yarn. Therefore, the binding cord using the bulked multifilament yarn has high binding properties and is not likely to loosen. This can improve the binding properties and reduce the load on the fingertips of workers.

(2) The binding cord of the present invention has a uniform load of binding, which reduces the load on the insulating film.

(3) Due to the use of the continuous filament yarn, the binding cord of the present invention prevents the generation of fluff, which is observed in the spun yarn.

(4) The binding cord of the present invention is suitable for both mechanical binding and manual binding.

DETAILED DESCRIPTION OF THE INVENTION

Figure 1:
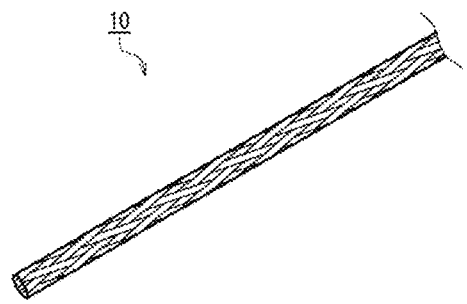
FIG. 1 is a schematic side view of a binding cord for a motor according to an embodiment of the present invention.

A binding cord for a motor of the present invention may be used to bind motor components such as a coil, a wire, and a sleeve. The binding cord is preferably used for a motor for an electric vehicle.

The synthetic fibers used in the present invention preferably have a melting point or decomposition temperature of 280° C. or more. Examples of the synthetic fibers include polyphenylene sulfide fibers, aramid fibers, polyether ether ketone fibers, polyarylate fibers, and heterocyclic polymer (PBO) fibers. In particular, polyphenylene sulfide (PPS) fibers are preferred because of high oil resistance and high hydrolysis resistance.

The multifilament yarn constituting the binding cord of the present invention is a bulked yarn that has a loop and a slack in the direction of the yarn axis. The multifilament yarn of the present invention will also be referred to as a textured yarn in the following. There are many types of textured yarns and various processing methods. Any textured yarn may be used in the present invention. The study conducted by the present inventors showed that a textured yarn with low stretchability and appropriate bulkiness is preferably used for the binding cord for a motor. Specifically, the degree of bulkiness of the multifilament yarn, which is measured by the method as will be described later, is preferably 1.5 to 25 ml/g, and more preferably 2 to 20 ml/g. If the degree of bulkiness is low, the multifilament yarn is not much different from an unprocessed straight yarn, so that the multifilament yarn is not easily tied and is more likely to come undone. If the degree of bulkiness is too high, the workability is poor, and the thickness of the cord is increased, which makes the motor less compact.

The processing method is not particularly limited. For example, fluid jet processing, false twist processing, or pushing processing may be appropriately selected from the known processing methods, and the conditions may be set accordingly. The fluid jet processing such as air jet processing is preferred, since it can produce a textured yarn with low stretchability and appropriate bulkiness that is suitable for the present invention. Even with other processing methods, the favorable bulkiness may also be achieved by thermally setting the multifilament yarn under a tension. It is particularly preferable that the multifilament yarn is subjected to Taslan processing with the use of a fluid jet (turbulence). The Taslan finished yarn has a loop and a slack in the direction of the yarn axis. Moreover, the Taslan finished yarn is a non-torque type and also has bulkiness and low stretchability. The friction between the yarns is larger in the bulked multifilament yarn than in the non-bulked multifilament yarn. Therefore, the binding cord using the bulked multifilament yarn has high binding properties and is not likely to loosen.

The binding cord of the present invention is obtained by braiding the bulked multifilament yarns into a braid. For braiding, the multifilament yarn may be an untwisted yarn. It is preferable that the braid is composed of 4 to 32 strands. Within this range, the braid can have sufficient tenacity, good binding properties, and high durability. It is more preferable that the braid is composed of 4, 8, 16, 20, 24, or 32 strands. The binding cord of the present invention may be either a round braid or a square braid.

In the binding cord of the present invention, the bulked multifilament yarn may be a twisted yarn. The twisted yarn may be obtained by thermally setting the multifilament yarn at 100 to 250° C. for 0.1 to 90 minutes. The twisted yarn is not braided, but is used directly for the binding cord.

The single fiber fineness of the multifilament yarn is preferably 1.5 to 35 dtex, more preferably 2 to 32 dtex, and further preferably 3 to 30 dtex. If the single fiber is too thin, fluff is likely to be generated due to friction or the like. If the single fiber is too thick, the yarn becomes stiff, and the binding properties are reduced.

The fineness of the multifilament yarn is preferably 200 to 1500 dtex, and more preferably 300 to 1200 dtex. The mass of the binding cord per meter is preferably 0.08 to 1.2 g/m (fineness: 800 to 12000 dtex), and more preferably 1000 to 10000 g/m.

The high temperature oil resistance of the binding cord is expressed by the following formula, and is preferably 50% or more, more preferably 55% or more, and further preferably 70% or more. This can provide a motor for an electric vehicle that ensures stable running for a long period of time.

$$\text{High temperature oil resistance (\%)} = (T'/T) \times 100,$$

where T represents a tensile strength of the binding cord before a treatment and T' represents a tensile strength of the binding cord after the treatment. The tensile strength T and the tensile strength T' mean a tensile strength measured in accordance with JIS L1013-8.5.1. The treatment includes putting the entire binding cord in a mixture of 0.5 wt % of water and 99.5 wt % of an automatic transmission fluid in a closed container, and heating the container so that the mixture in the container is maintained at 150° C. for 1000 hours.

In the present invention, the tensile strengths before and after the high temperature treatment in oil are compared and evaluated based on tenacity retention, thereby determining the high temperature oil resistance. If the resulting value is close to 100%, the tensile strength of the binding cord remains unchanged even after the high temperature treatment, which indicates that the binding cord has excellent high temperature oil resistance.

The tensile strength of the binding cord of the present invention is measured in accordance with JIS L1013-8.5.1, and is preferably 100 N or more. The rate of elongation of the binding cord of the present invention is measured in accordance with JIS L1013-8.5.1, and is preferably 16% to 60%. Consequently, the binding cord has high binding properties. The use of this binding cord in a motor for an automobile, particularly an electric vehicle, allows the vehicle to run stably. The rate of elongation of the binding cord is more preferably 18% to 50%.

The present invention uses the bulked multifilament yarn as a braiding yarn. Compared to a normal non-textured (non-bulked) multifilament yarn, the bulked multifilament yarn is found to be easily tied and less likely to come undone because the yarns do not easily slide each other. Compared to a spun yarn, the bulked multifilament yarn includes long fibers, and therefore almost no fluff falls off when the multifilament yarn is processed or used with the motor component for operation. If the degree of bulkiness is low, the multifilament yarn is not much different from an unprocessed straight yarn, so that the multifilament yarn is not easily tied and is more likely to come undone. If the degree of bulkiness is too high, the workability is poor, and the thickness of the cord is increased, which makes the motor less compact.

Figure 2:
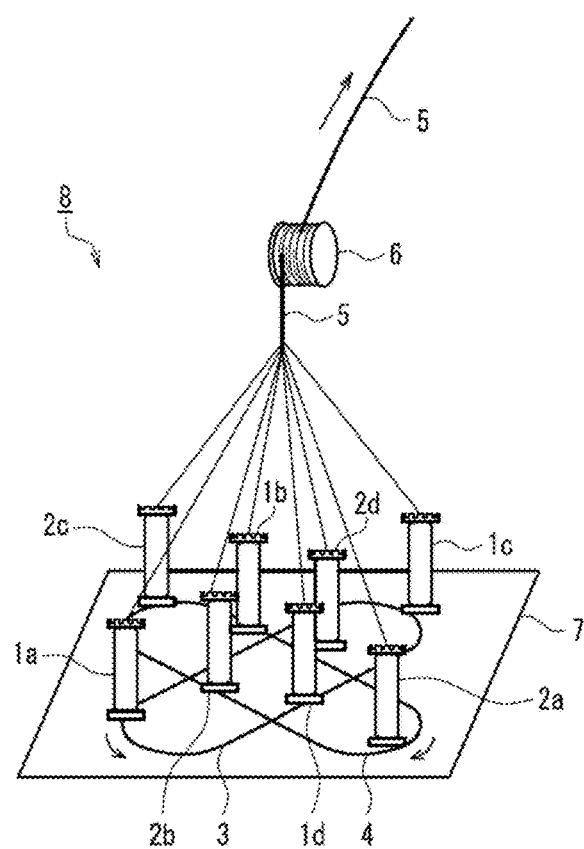
FIG. 2 is a schematic diagram illustrating a manufacturing process of a square braid according to an embodiment of the present invention.

Hereinafter, the present invention will be described with reference to the drawings. In the following drawings, the same components are denoted by the same reference numerals. FIG. 1 is a schematic side view of a binding cord 10 for a motor according to an embodiment of the present invention. FIG. 2 is a schematic diagram illustrating a manufacturing process of a square braid according to an embodiment of the present invention. Bobbins (carriers) 1a to 1d follow a track 3 and bobbins (carriers) 2a to 2d follow a track 4, so that strands are braided into a braid 5. Reference numeral 6 represents a guide roll, 7 represents a base plate, and 8 represents a square braider. The bobbins (carriers) move in a clockwise or counterclockwise direction, and the two tracks cross each other. Thus, the strands are braided together without forming a hollow in the center, and the braid 5 has a square cross section rather than a flat shape.

Figure 3:
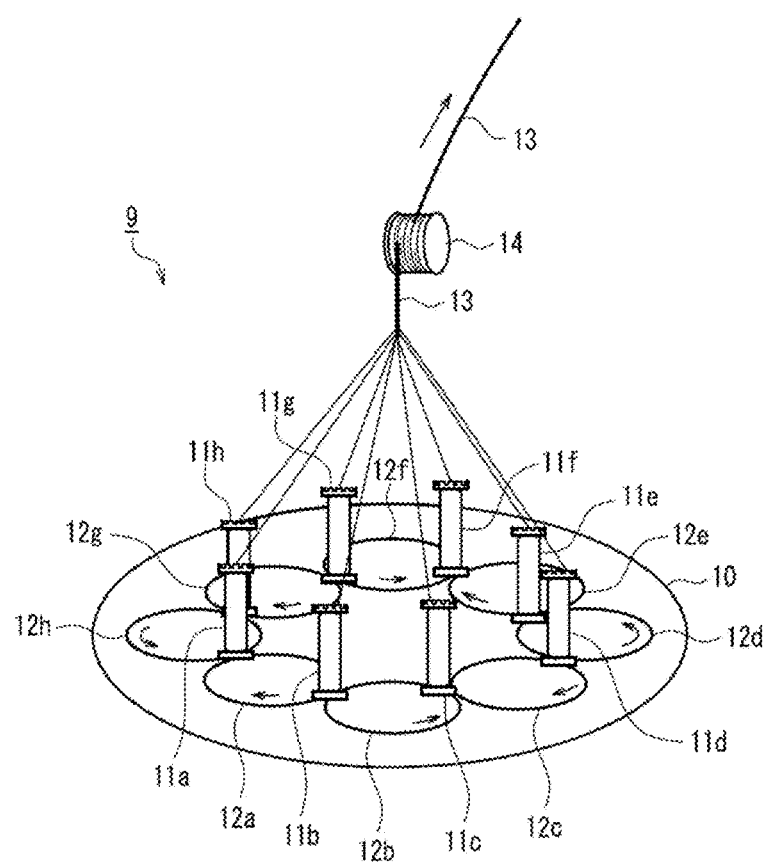
FIG. 3 is a schematic diagram illustrating a manufacturing process of a round braid according to an embodiment of the present invention.

FIG. 3 is a schematic diagram illustrating a manufacturing process of a round braid according to an embodiment of the present invention. Bobbins (carriers) 11a to 11h follow circular tracks 12a to 12h, so that strands are braided into a braid 13. Reference numeral 14 represents a guide roll, 10 represents a base plate, and 9 represents a round braider. The bobbins (carriers) move in circles in a clockwise or counterclockwise direction while crossing each other. Thus, the strands are braided together with a hollow being formed in the center, and the braid 13 has a round cross section.

Figure 4:
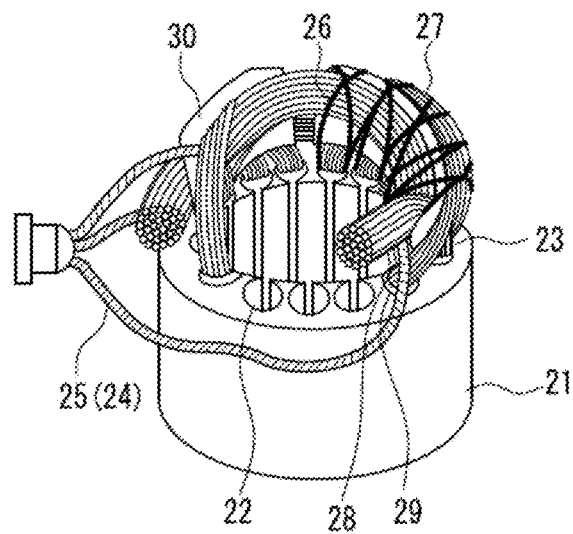
FIG. 4 is a schematic perspective view of a binding cord incorporated into a motor for an electric vehicle according to an embodiment of the present invention.

FIG. 4 is a schematic perspective view of a binding cord incorporated into a motor for an electric vehicle according to an embodiment of the present invention. In FIG. 4, a stator of the motor may be, e.g., a stator for a three-phase motor. The motor includes the following: a stator core 21; coils 23 for each phase that are placed in a plurality of slots 22 formed in the inner circumferential surface of the stator core 21; wires 24 that connect the coils 23 for each phase to an external power supply terminal; and wire insulation tubes 25 for covering each of the wires 24. A binding cord 26 is used to bind the coils 23. Reference numeral 27 represents a thermostat insulation tube, 28 represents a slot liner, 29 represents a wedge, and 30 represents an interphase paper.

EXAMPLES

Hereinafter, the present invention will be described in more detail by using examples and comparative examples. However, the present invention is not limited to the following examples. The measurements in the examples and the comparative examples were performed in the following manner.

<High Temperature Oil Resistance of Binding Cord>

A mixture (5 L) of 0.5 wt % of water and 99.5 wt % of an automatic transmission fluid (trade name: "ULTRAATF-Z1 automatic transmission oil" manufactured by Idemitsu Kosan Co., Ltd.) was placed in a closed container. The entire binding cord, 60 cm in length, was put in the mixture, and then the container was heated so that the mixture in the container was maintained at 150° C. for 1000 hours. A tensile strength (T) of the binding cord before the treatment and a tensile strength (T') of the binding cord after the treatment were measured in accordance with JIS L1013-8.5.1. Substituting each of the tensile strengths into the following formula yields the high temperature oil resistance. The measurement was performed 5 times, and the average of the measured values was calculated. Any automatic transmission fluid (ATF) may be used in this measuring method.

$$\text{High temperature oil resistance (\%)} = (T'/T) \times 100,$$

where T represents a tensile strength of the binding cord before the treatment and T' represents a tensile strength of the binding cord after the treatment.

<Tensile Strength and Rate of Elongation of Multifilament Yarn and Binding Cord>

The tensile strength and the rate of elongation were measured by a method using a constant-rate-of-extension tester in accordance with JIS L 1013-8.5.1 (distance between grips: 25 cm, pulling speed: 30 cm/min). The test was performed 5 times, and the average of the measured values was calculated (down to the second decimal place for the tensile strength and down to the first decimal place for the rate of elongation).

<Degree of Bulkiness of Binding Cord>

Figure 5:
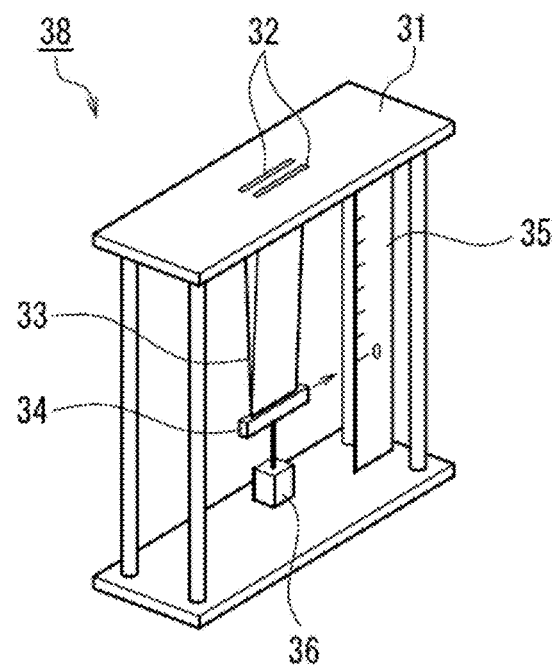
FIG. 5 is a schematic perspective view illustrating a device for measuring the degree of bulkiness of a binding cord according to an embodiment of the present invention.
Figure 6A:
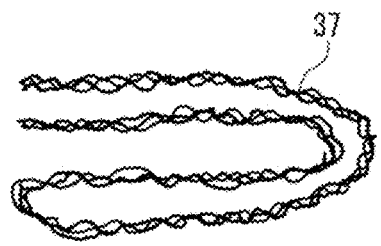
FIG. 6A is a side view of a yarn used in a method for measuring the degree of bulkiness of a binding cord according to an embodiment of the present invention.
Figure 6B:
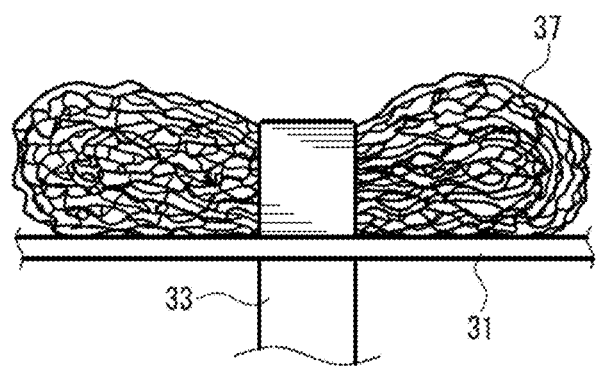
FIG. 6B is a side view of a hank used in the method for measuring the degree of bulkiness of a binding cord.
Figure 6C:
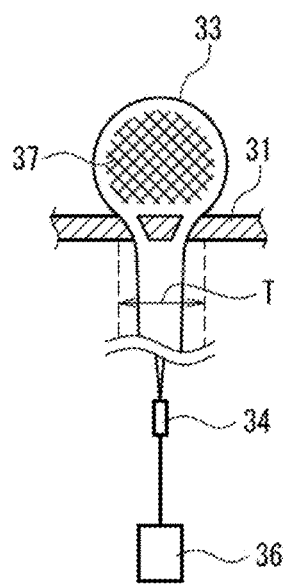
FIG. 6C is a cross-sectional view illustrating the measurement of the degree of bulkiness of a binding cord.

FIG. 5 is a schematic perspective view illustrating a device 38 for measuring the degree of bulkiness of a binding cord (the device is manufactured by DAIEI KAGAKU SEIKI MFG. CO., LTD). FIG. 6A is a side view of a yarn used in a method for measuring the degree of bulkiness of a binding cord. FIG. 6B is a side view of a hank used in the method for measuring the degree of bulkiness of a binding cord. FIG. 6C is a cross-sectional view illustrating the measurement of the degree of bulkiness of a binding cord. In FIG. 5, two slits 32 are formed in the upper surface of a sample support 31. The distance T from the outer edge of one slit to the outer edge of the other is 6 mm. A soft fabric tape 33 with a width of 2.5 cm is hung through the slits 32, and a fastener 34 provided with a pointer is attached to the bottom of the tape 33, which is 20 cm under the slits 32. A weight 36 is suspended from the fastener 34. When no sample is mounted, the pointer of the fastener 34 is set to the zero position of a scale 35. A hank 37 with an appropriate perimeter was prepared as a sample (FIG. 6A). The hank 37 was formed into an oblong shape in which the yarns were aligned parallel to each other to have a total fineness of about 90000 dtex (corresponding to 200 multifilament yarns, each having a fineness of 440 to 470 dtex). Then, the hank 37 was inserted between the tape 33 and the sample support 31, as illustrated in FIGS. 6B and 6C. The sum of the weight 36 and the fastener 34 was set to 50 g, and a value S (cm) on the pointer was read. The sample was measured three times, while the position of the sample was changed for each measurement. The average of the measured values was calculated. The degree of bulkiness M was determined by the following formula.

$M$ (ml/g)=the volume of yarns within the tape/the weight of yarns within the tape=$V/W$, $V=(S^2/\pi)\times 2.5$, $W=P\times D\times(1/10000)\times 0.025$, where D represents the fineness (dtex) of the sample yarn, and P represents the number of yarns (200 in the examples) within the tape.

<Mass of Binding Cord Per Meter>

A binding cord for a motor was allowed to stand for 24 hours under the standard conditions (temperature: 20±2° C., relative humidity: 65±2%). Then, the binding cord was cut to 50 cm long. The weight of the 50 cm binding cord was measured and doubled, resulting in the mass of the binding cord per meter.

<Braiding Pitch of Binding Cord>

A binding cord was observed with a linen tester (loupe) having a 1 inch (2.54 cm) square frame. The number of stitches (i.e., the number of peaks or valleys) within 1 inch of the binding cord was counted until a half stitch was reached.

<Binding Properties of Binding Cord>

A bundle of 50 copper wires for a coil (each copper wire having a diameter of 0.9 mm) was bound with a binding cord by hand. The ease of binding and the degree of fixation (recovery) after the binding cord was tied were evaluated on a scale of 1 to 5, as described below.

5: The manual binding was good, and the binding cord did not recover after it was tied.

4: The manual biding was almost good, and the binding cord slightly recovered after it was tied.

3: The manual binding was somewhat good, and the binding cord recovered to some extent after it was tied, but was able to be used.

2: The manual binding was insufficient, and the knot loosened after the binding cord was tied, making the binding cord unsuitable for practical use.

1: The manual binding was bad, and the knot was not fixed and greatly loosened after the binding cord was tied.

In addition to the binding properties, the workability was also evaluated.

<Evaluation of Fall of Fluff (1)>

Figure 7:
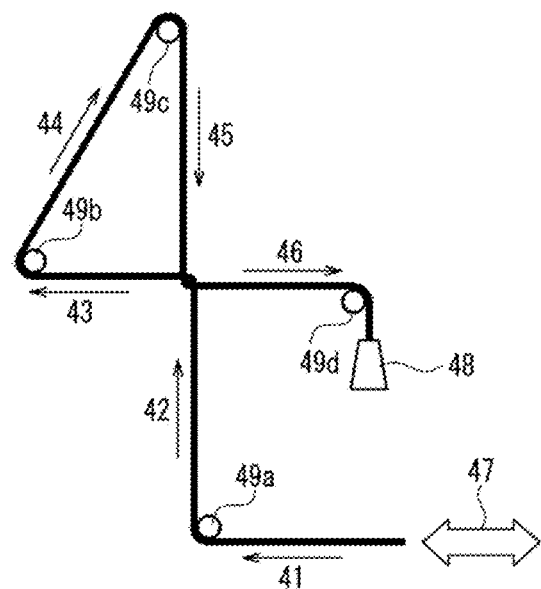
FIG. 7 is a diagram illustrating a method for measuring the evaluation of fall of fluff according to an embodiment of the present invention.

Using a tester illustrated in FIG. 7, a test was conducted in such a manner that a binding cord was stretched to have an intersection where friction was produced. In FIG. 7, the binding cord passed through guides 49a to 49d, as indicated by the arrows 41 to 46, so that one line of the binding cord intersected with the other. The end of the binding cord was connected to a load (weight) 48. The binding cord was reciprocated in the directions of the arrow 47 under the conditions that the load was 100 g, the distance of the movement was 55 mm, the reciprocating speed was 90 times/min, and the number of occurrences of friction was 50. Subsequently, the fall of fluff and the presence or absence of fluff floating during the test were evaluated. The results were rated on a scale of 1 to 5, as described below.

5: No fluff was generated, no fluff was floating, and the appearance of the cord was unchanged after the friction.

4: A small amount of fluff was generated, but no fluff fell off, and no fluff was floating.

3: Fluff was generated, and a small amount of fluff fell off.

2: Both the generation of fluff and the fall of fluff were clearly observed.

1: A large amount of fluff was generated and fell off.

<Evaluation of Fall of Fluff (2)>

An automatic transmission fluid (ATF) oil was applied to a binding cord. Using the tester illustrated in FIG. 7 and the binding cord, a test was conducted in the same manner as described above. The fall of fluff and the presence or absence of fluff floating during the test were evaluated under the same conditions. In this case, the measurement was performed at a room temperature of 20° C., in a wet process, and with the application of oil.

Examples 1, 2

Figure 8:
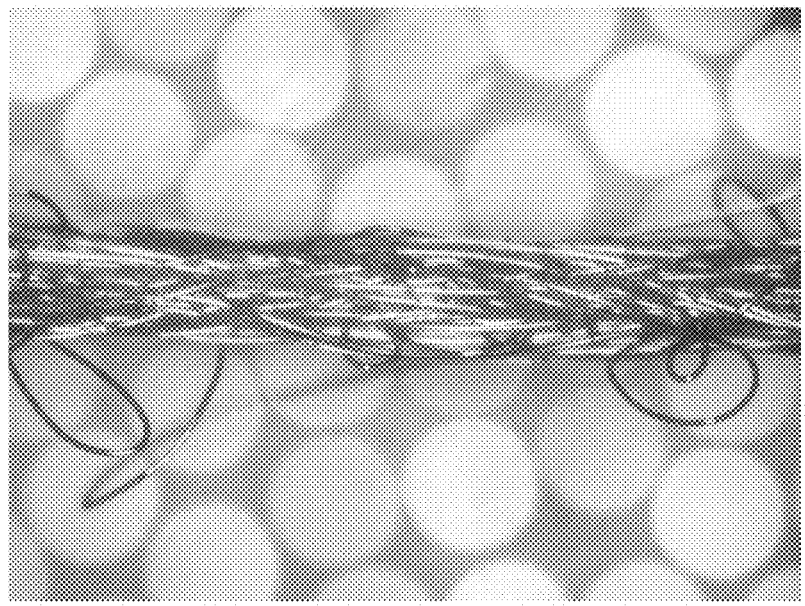
FIG. 8 is a photograph of a side view of a Taslan finished yarn according to an embodiment of the present invention.
Figure 9:
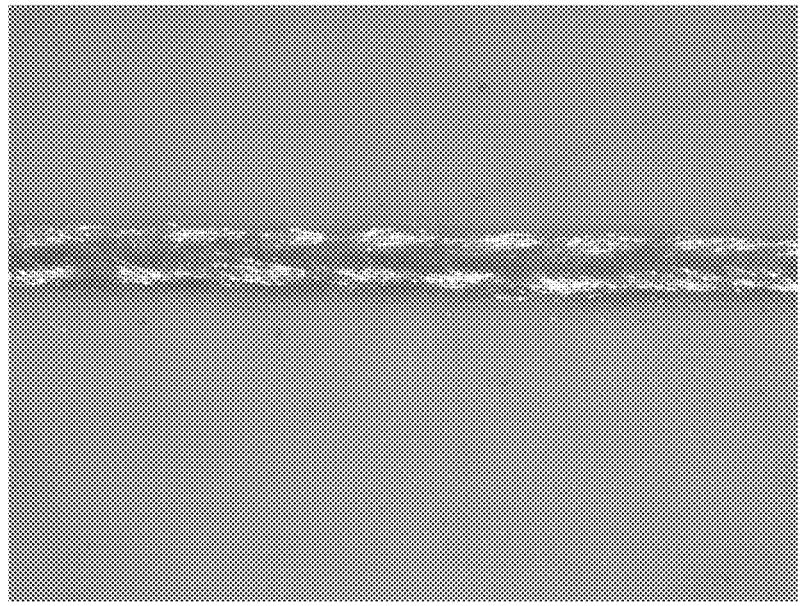
FIG. 9 is a photograph of a side view of a binding cord including the Taslan finished yarn according to an embodiment of the present invention.

A multifilament yarn 440T-100-T190 made of PPS fibers (trade name: "TORCON", melting point: 285° C., manufactured by Toray Industries, Inc.) was subjected to Taslan processing with the use of an air jet to form a textured yarn. The degree of bulkiness of this textured yarn was 2.14 ml/g. Around braid (binding cord) of 8 strands (Example 1) and a square braid (binding cord) of 8 strands (Example 2) were produced by using the textured yarn. Table 1 shows the conditions and the results together. FIG. 8 is a photograph of a side view of the textured yarn in Example 2. FIG. 9 is a photograph of a side view of the binding cord in Example 2.

Example 3

Figure 10:
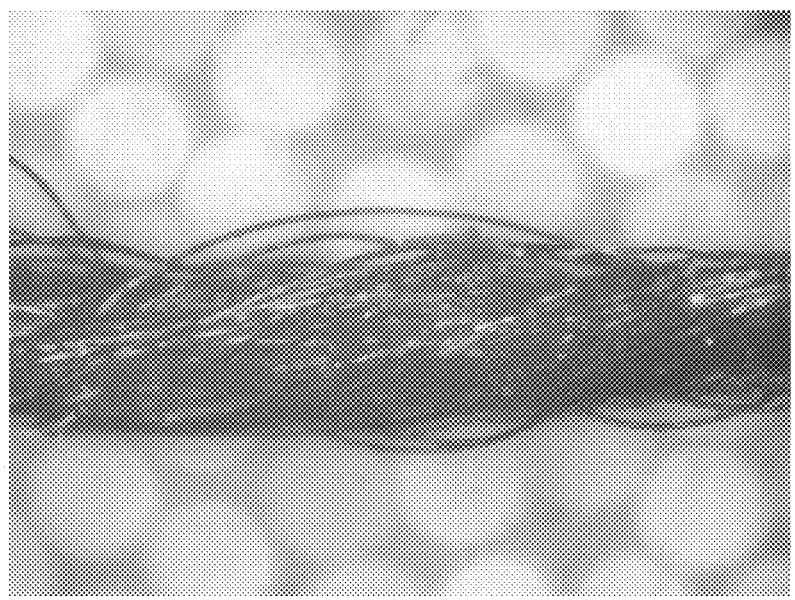
FIG. 10 is a photograph of a side view of a false twisted yarn according to an embodiment of the present invention.
Figure 11:
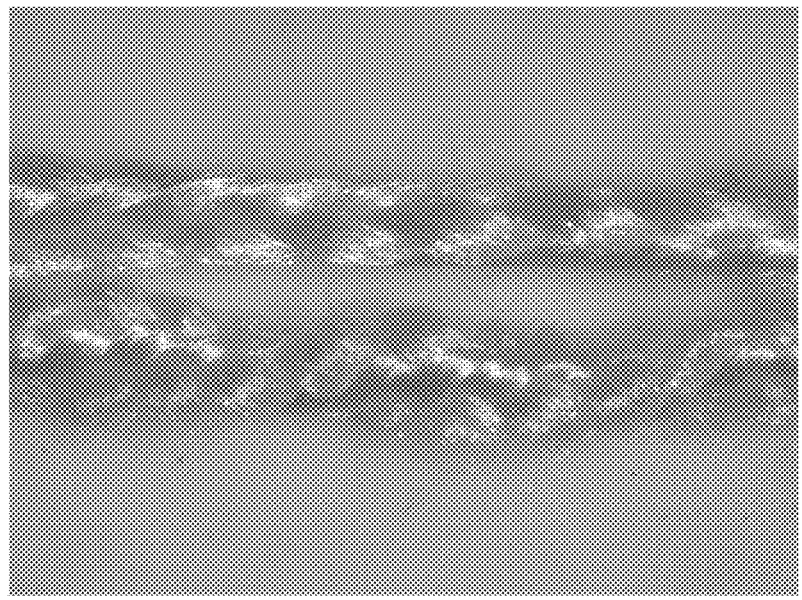
FIG. 11 is a photograph of a side view of a binding cord including the false twisted yarn according to an embodiment of the present invention.

A multifilament yarn 440T-100-T190 made of PPS fibers (trade name: "TORCON", melting point: 285° C., manufactured by Toray Industries, Inc.) was subjected to false twist processing to form a textured yarn. The degree of bulkiness of this textured yarn was 19.6 ml/g. A square braid (binding cord) of 8 strands (Example 3) was produced by using the textured yarn. Table 1 shows the conditions and the results together. FIG. 10 is a photograph of a side view of the false twisted yarn in Example 3. FIG. 11 is a photograph of a side view of the binding cord in Example 3.

Comparative Example 1

Figure 12:
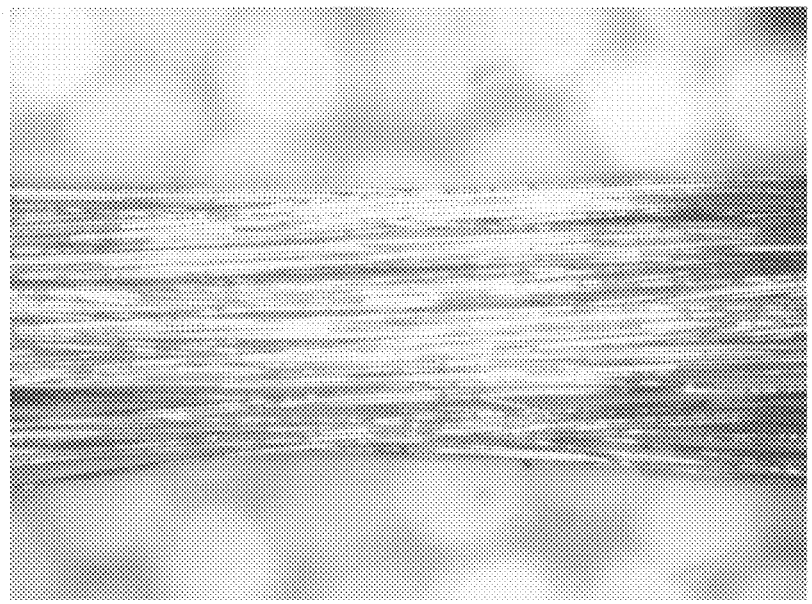
FIG. 12 is a photograph of a side view of a non-bulked yarn in Comparative Example.
Figure 13:
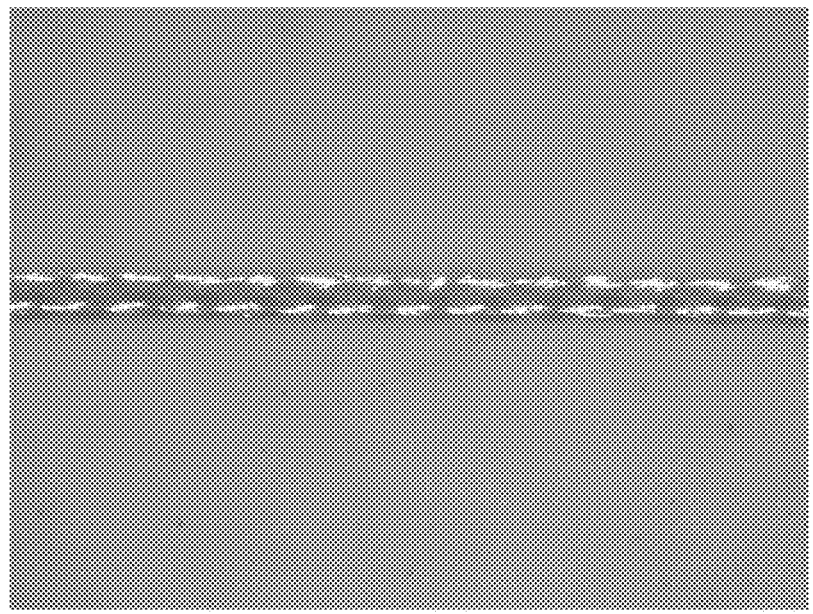
FIG. 13 is a photograph of a side view of a binding cord including the non-bulked yarn in Comparative Example.

A multifilament yarn 440T-100-T190 made of PPS fibers (trade name: "TORCON" manufactured by Toray Industries, Inc.) was wound on each of 8 small bobbins. The degree of bulkiness of the multifilament yarn was 0.74 ml/g. These bobbins were mounted on an 8-carrier square braider, and a binding cord was produced. Table 1 shows the conditions and the results together. FIG. 12 is a photograph of a side view of the multifilament yarn in Comparative Example 1. FIG. 13 is a photograph of a side view of the binding cord in Comparative Example 1.

Comparative Examples 2, 3

Figure 14:
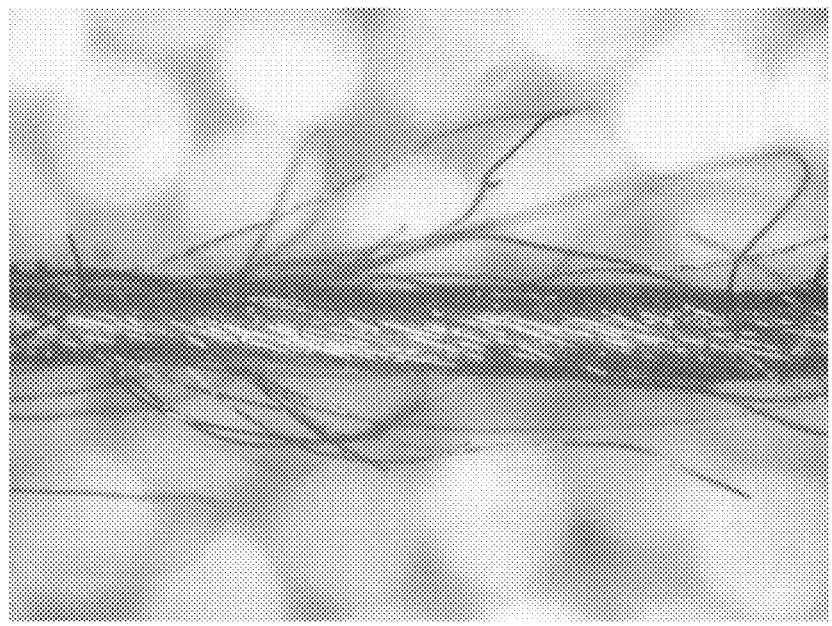
FIG. 14 is a photograph of a side view of a spun yarn in Comparative Example.
Figure 15:
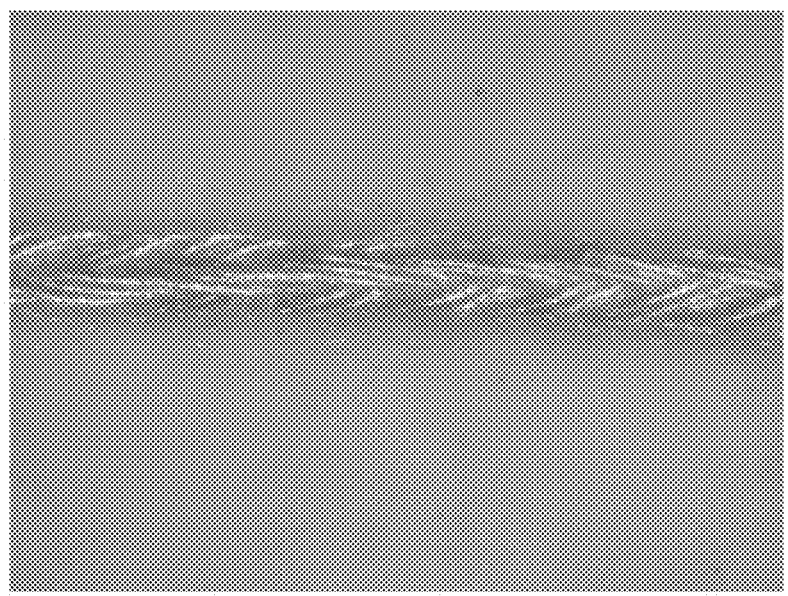
FIG. 15 is a photograph of a side view of a binding cord including the spun yarn in Comparative Example.

A spun yarn made of PPS fibers (trade name: "TORCON", a 20-count yarn (metric count), manufactured by Toray Industries, Inc.) was wound on each of 8 small bobbins. The degree of bulkiness of the spun yarn was 1.69 ml/g. Around braid (binding cord) of 8 strands (Comparative Example 2) and a square braid (binding cord) of 8 strands (Comparative Example 3) were produced by using the spun yarn. Table 1 shows the conditions and the results together. FIG. 14 is a photograph of a side view of the spun yarn in Comparative Example 3. FIG. 15 is a photograph of a side view of the binding cord in Comparative Example 3.

which come within the meaning and range of equivalency of the claims are intended to be embraced therein.

INDUSTRIAL APPLICABILITY

The binding cord for a motor of the present invention is suitable for a motor for an electric vehicle. The binding cord is also applicable to other motors.

TABLE 1

| | | Ex. 1 | Ex. 2 | Ex. 3 | Comp. Ex. 1 | Comp. Ex. 2 | Comp. Ex. 3 |
|---|---|---|---|---|---|---|---|
| Raw yarn | Type of yarn | textured yarn | textured yarn | false twisted filament | filament | spun yarn | spun yarn |
| | Brand | 440T-100F-Taslan finished | 440T-100F-Taslan finished | 440T-100F-false twisted | 440T-100F-T190 | 20s/1 | 20s/1 |
| | Fineness (dtex) | 476 | 476 | 466 | 440 | 292 | 292 |
| | Strength (CN/dtex) | 3.1 | 3.1 | 3.6 | 4.4 | 2.6 | 2.6 |
| | Rate of elongation (%) | 20.3 | 20.3 | 19.9 | 20.1 | 17.1 | 17.1 |
| | Degree of bulkiness (ml/g) | 2.14 | 2.14 | 19.6 | 0.73 | 1.71 | 1.71 |
| Binding cord | Raw yarn configuration | 440T/1 × 8 | 440T/1 × 8 | 440T/1 × 8 | 440T/1 × 8 | #20/2 × 8 | #20/2 × 8 |
| | Type | round 8 | square 8 | square 8 | square 8 | round 8 | square 8 |
| | Total fineness of raw yarn (dtex) | 3520 | 3520 | 3520 | 3520 | 4672 | 4672 |
| | Tenacity (N) | 156 | 142 | 153 | 163 | 165 | 159 |
| | Strength (CN/dtex) | 4.3 | 3.7 | 4 | 4.5 | 3.3 | 3.3 |
| | Rate of elongation (%) | 24.1 | 23.8 | 28.4 | 24.3 | 26.7 | 25.3 |
| | Pitch (stitch/inch) | 7.8 | 10.6 | 11.2 | 10.0 | 7.6 | 9.0 |
| | Mass (g/m) | 0.3611 | 0.3823 | 0.385 | 0.363 | 0.501 | 0.4867 |
| | High temperature oil resistance (%) | 91 | 90 | 89 | 92 | 86 | 85 |
| | Evaluation of binding properties | 5 | 5 | 5 | 2 | 5 | 5 |
| | Evaluation of fall of fluff (1) | 5 | 5 | 5 | 4 | 2 | 2 |
| | Evaluation of fall of fluff (2) | 5 | 5 | 5 | 4 | 2 | 2 |
| | Workability | There was no problem. | There was no problem. | The yarn was curled but did not have a problem. | The yarn slid easily. | Fluff fell off. | Fluff fell off. |

As can be seen from Table 1, the results confirmed that the binding cord using the bulked multifilament yarn in the Examples of the present invention had excellent high temperature oil resistance and high binding properties, and effectively prevented the generation of fluff. On the other hand, the non-bulked multifilament yarn had a problem in the manual binding. The spun yarn caused fluffing, and the fall of fluff was prominent. Moreover, the spun yarn was inferior to the filament yarn in strength.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes

DESCRIPTION OF REFERENCE NUMERALS

| | |
|---|---|
| 1a to 1d, 2a to 2d, 11a to 11h | Bobbin (carrier) |
| 3, 4, 12a to 12h | Track |
| 5, 13 | Braid |
| 6, 14 | Guide roll |
| 7, 10 | Base plate |
| 8 | Square braider |
| 9 | Round braider |
| 21 | Stator core |
| 22 | Slot |
| 23 | Coil |
| 24 | Wire |
| 25 | Wire insulation tube |
| 26 | Binding cord |
| 27 | Thermostat insulation tube |
| 28 | Slot liner |
| 29 | Wedge |

| | |
|---|---|
| 30 | Interphase paper |
| 48 | Load (weight) |
| 49a to 49d | Guide |

What is claimed is:

1. A binding cord for a motor, comprising:
a multifilament yarn made of synthetic fibers,
wherein the multifilament yarn is a Taslan finished yarn which is a bulked yarn with loops and bows that are formed of filaments constituting the Taslan finished yarn and protruding from a surface of the yarn,
a degree of bulkiness of the multifilament yarn is at least 2 ml/g, and
high temperature oil resistance of the binding cord expressed by the following formula is 50% or more:
High temperature oil resistance (%)=(T'/T)×100,
where T represents a tensile strength of the binding cord before a treatment and T' represents a tensile strength of the binding cord after the treatment,
the tensile strength T and the tensile strength T' mean a tensile strength measured in accordance with JIS L1013-8.5.1, and
the treatment includes putting the entire binding cord in a mixture of 0.5 wt % of water and 99.5 wt % of an automatic transmission fluid in a closed container, and heating the container so that the mixture in the container is maintained at 150° C. for 1000 hours.

2. The binding cord for a motor according to claim 1, wherein the multifilament yarn is processed by a fluid jet.

3. The binding cord for a motor according to claim 1, wherein the multifilament yarn is made of at least one selected from the group consisting of polyphenylene sulfide fibers, aramid fibers, polyether ether ketone fibers, polyarylate fibers, and heterocyclic polymer (PBO) fibers.

4. The binding cord for a motor according to claim 1, wherein the binding cord is a braid, and the multifilament yarn constituting the binding cord is an untwisted yarn.

5. The binding cord for a motor according to claim 1, wherein the binding cord is a braid of 4 to 32 strands.

6. The binding cord for a motor according to claim 1, wherein the multifilament yarn has a single fiber fineness of 1.5 to 35 dtex and a fineness of 200 to 1500 dtex.

7. The binding cord for a motor according to claim 1, wherein a mass of the binding cord per unit length is 0.08 to 1.2 g/m.

8. A binding cord for a motor, comprising:
a multifilament yarn made of synthetic fibers,
wherein the multifilament yarn is a Taslan finished yarn which is a bulked yarn with loops and bows that are formed of filaments constituting the Taslan finished yarn and protruding from a surface of the yarn,
a degree of bulkiness of the multifilament yarn is at least 2 ml/g, and
the multifilament yarn is made of at least one selected from the group consisting of polyphenylene sulfide fibers, aramid fibers, polyether ether ketone fibers, polyarylate fibers, and heterocyclic polymer (PBO) fibers.

9. The binding cord for a motor according to claim 8, wherein the multifilament yarn is processed by a fluid jet.

10. The binding cord for a motor according to claim 8, wherein high temperature oil resistance of the binding cord expressed by the following formula is 50% or more: High temperature oil resistance (%)=(T'/T)×100, where T represents a tensile strength of the binding cord before a treatment and T' represents a tensile strength of the binding cord after the treatment,
the tensile strength T and the tensile strength T' mean a tensile strength measured in accordance with JIS L1013-8.5.1, and
the treatment includes putting the entire binding cord in a mixture of 0.5 wt % of water and 99.5 wt % of an automatic transmission fluid in a closed container, and heating the container so that the mixture in the container is maintained at 150° C. for 1000 hours.

11. The binding cord for a motor according to claim 8, wherein the binding cord is a braid, and the multifilament yarn constituting the binding cord is an untwisted yarn.

12. The binding cord for a motor according to claim 8, wherein the binding cord is a braid of 4 to 32 strands.

13. The binding cord for a motor according to claim 8, wherein the multifilament yarn has a single fiber fineness of 1.5 to 35 dtex and a fineness of 200 to 1500 dtex.

14. The binding cord for a motor according to claim 8, wherein a mass of the binding cord per unit length is 0.08 to 1.2 g/m.

15. A binding cord for a motor, comprising:
a multifilament yarn made of synthetic fibers,
wherein the multifilament yarn is a Taslan finished yarn which is a bulked yarn with loops and bows that are formed of filaments constituting the Taslan finished yarn and protruding from a surface of the yarn,
a degree of bulkiness of the multifilament yarn is at least 2 ml/g, and
the binding cord is a braid, and the multifilament yarn constituting the binding cord is an untwisted yarn.

16. The binding cord for a motor according to claim 15, wherein the multifilament yarn is processed by a fluid jet.

17. The binding cord for a motor according to claim 15, wherein high temperature oil resistance of the binding cord expressed by the following formula is 50% or more: High temperature oil resistance (%)=(T'/T)×100,
where T represents a tensile strength of the binding cord before a treatment and T' represents a tensile strength of the binding cord after the treatment,
the tensile strength T and the tensile strength T' mean a tensile strength measured in accordance with JIS L1013-8.5.1, and
the treatment includes putting the entire binding cord in a mixture of 0.5 wt % of water and 99.5 wt % of an automatic transmission fluid in a closed container, and heating the container so that the mixture in the container is maintained at 150° C. for 1000 hours.

18. The binding cord for a motor according to claim 15, wherein the multifilament yarn is made of at least one selected from the group consisting of polyphenylene sulfide fibers, aramid fibers, polyether ether ketone fibers, polyarylate fibers, and heterocyclic polymer (PBO) fibers.

19. The binding cord for a motor according to claim 15, wherein the braid includes 4 to 32 strands.

20. The binding cord for a motor according to claim 15, wherein the multifilament yarn has a single fiber fineness of 1.5 to 35 dtex and a fineness of 200 to 1500 dtex.

21. The binding cord for a motor according to claim 15, wherein a mass of the binding cord per unit length is 0.08 to 1.2 g/m.

22. A binding cord for a motor, comprising:
a multifilament yarn made of synthetic fibers,
wherein the multifilament yarn is a Taslan finished yarn which is a bulked yarn with loops and bows that are formed of filaments constituting the Taslan finished yarn and protruding from a surface of the yarn, a degree of bulkiness of the multifilament yarn is at least 2 ml/g, and the binding cord is a braid of 4 to 32 strands.

23. The binding cord for a motor according to claim 22, wherein the multifilament yarn is processed by a fluid jet.

24. The binding cord for a motor according to claim 22, wherein high temperature oil resistance of the binding cord expressed by the following formula is 50% or more: High temperature oil resistance (%)=(T'/T)×100, where T represents a tensile strength of the binding cord before a treatment and T' represents a tensile strength of the binding cord after the treatment, the tensile strength T and the tensile strength T' mean a tensile strength measured in accordance with JIS L1013-8.5.1, and the treatment includes putting the entire binding cord in a mixture of 0.5 wt % of water and 99.5 wt % of an automatic transmission fluid in a closed container, and heating the container so that the mixture in the container is maintained at 150° C. for 1000 hours.

25. The binding cord for a motor according to claim 22, wherein the multifilament yarn is made of at least one selected from the group consisting of polyphenylene sulfide fibers, aramid fibers, polyether ether ketone fibers, polyarylate fibers, and heterocyclic polymer (PBO) fibers.

26. The binding cord for a motor according to claim 22, wherein the multifilament yarn constituting the binding cord is an untwisted yarn.

27. The binding cord for a motor according to claim 22, wherein the multifilament yarn has a single fiber fineness of 1.5 to 35 dtex and a fineness of 200 to 1500 dtex.

28. The binding cord for a motor according to claim 22, wherein a mass of the binding cord per unit length is 0.08 to 1.2 g/m.

* * * * *